2,941,858
MIXTURES OF WATER-INSOLUBLE DISAZO DYESTUFFS

Willy Forter, Neu-Allschwil, and Fritz Kehrer, Basel, Switzerland, assignors to Sandoz Ltd., Basel, Switzerland No Drawing. Filed Jan. 30, 1958, Ser. No. 712,086

Claims priority, application Switzerland Feb. 8, 1957

7 Claims. (Cl. 8—26)

It is known that upon coupling 2 mols of a 2-hydroxynaphthalene-3-carboxylic acid-amide which is free from water-solubilizing groups with 1 mol of tetrazotized 3.3'-dialkoxy - 4.4' - diamino-1.1'-diphenyl, in particular 3.3'-dimethoxy-4.4'-diamino-1.1'-diphenyl, blue pigment dyestuffs are obtained which are very suitable for the production of navy blue shades.

It has now been unexpectedly found that when the 2-hydroxynaphthalene-3-carboxylic acid-amide of the abovementioned dyestuffs is partially replaced by a pyrazolone, dyestuffs are obtained which possess greatly superior covering power.

The present process for the production of mixtures of water-insoluble disazo dyestuffs therefore consists in coupling in alkaline medium 1 mol of the tetrazo compound of a diamine of the general formula

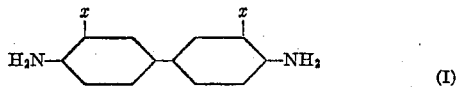

wherein x stands for hydrogen, halogen, methyl, ethyl, methoxy or ethoxy, with 2 mols of a mixture in any proportions of a 2-hydroxynaphthalene-3-carboxylic acid-amid and a 1-aryl-5-pyrazolone. The two azo components must be free from water-solubilizing groups. When x represents methoxy or ethoxy, the resultant mixtures of disazo dyestuffs may be converted into mixtures of their metal complex compounds by treatment with metal-yielding agents.

In addition to the already mentioned 3.3'-dimethoxy-4.4'-diamino-1.1'-diphenyl, examples of diamines of general Formula I which are of interest for the present purpose are 4.4'-diamino-1.1'-diphenyl, 3.3'-dichloro-, -difluoro- or -dibromo - 4.4' - diamino - 1.1' - diphenyl, 3.3'-dimethyl- or diethyl-4.4'-diamino-1.1'-diphenyl, 3.3'-diethoxy-4.4'-diamino-1.1'-diphenyl.

In choosing the 2 - hydroxynaphthalene - 3 - carboxylic acid-amide preference is given to those which contain attached to the nitrogen group of the amide alkyl, cycloalkyl, aralkyl or aryl radicals which may be substituted by non-water-solubilizing groups. Halogen atoms, methoxy, ethoxy, methyl, ethyl, and nitro groups are particularly suitable substituents.

The 1-aryl-5-pyrazolones which are indicated for use in the present process have the general formula

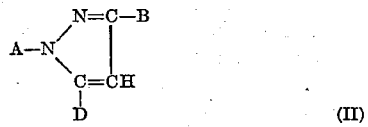

wherein A stands for a naphthyl or phenyl radical which may be substituted by non-water-solubilizing groups, B for a methyl, phenyl, amino, phenylamino, carboxylic acid-amide, carboxylic acid-phenyl-amide or carboxylic acid ethyl ester group, and D for the hydroxy or amino group. As substituents of the radical A, alkyl or alkoxy groups containing up to 5 carbon atoms, halogen atoms, cyano and nitro groups enter into special consideration.

The diamine is tetrazotized in a cold hydrochloric acid medium by the addition of a sodium nitrite solution. The tetrazo compound is coupled with the coupling components in a cold caustic alkaline medium, which preferably contains a certain amount of a water-soluble alcohol, such as methanol, if desired with the addition of pyridine.

When methoxy or ethoxy are present as substituents of the tetrazo compound, the resultant mixture of disazo dyestuffs can be converted into the copper or nickel complex compounds by metallizing under conditions producing dealkylation.

The ratio of the two coupling components may be varied as desired, provided the total amount is at least sufficient for complete formation of the disazo dyestuff mixture. These mixtures consist of one asymmetrical and two symmetrical disazo dyestuffs, their proportions varying according to the molecular ratio of the two coupling components and the mode of operation adopted for the production of the mixture.

Interesting disazo dyestuff mixtures are obtained when 1 mol of the tetrazo compound of the diamine of Formula I is coupled with a mixture of 1.0 to 1.94 mols of 2-hydroxynaphthalene-3-carboxylic acid-amide and 1.0 to 0.06 mol of 1-aryl-5-pyrazolone. Exceptionally good covering power is shown by the mixtures produced from a mixture of coupling components containing 1.2 to 1.85 mols of 2-hydroxynaphthalene-3-carboxylic acid-amide and 0.8 to 0.15 mol of 1-aryl-5-pyrazolone. For good covering power it is important that the proportion of the symmetrical dipyrazolone dyestuff should be as small as possible. This requirement is easily realized when 1 mol of the tetrazo compound of the diamine of Formula I is coupled with 2 mols of a mixture of coupling components of the last-named composition.

A method which is more effective and more widely applicable involves coupling in two stages. In the first stage 1 mol of the tetrazo compound is reacted with 1 mol of 2-hydroxynaphthalene-3-carboxylic acid-amide to give an intermediate compound, which in turn is coupled with 1 mol of a mixture of 2-hydroxynaphthalene-3-carboxylic acid-amide and of 1-aryl-5-pyrazolone. An addition of pyridine produces a marked acceleration of the second stage of the reaction.

The high covering power displayed by the dyestuff mixtures of the present invention can also be achieved when the asymmetrical and the two symmetrical dyestuffs are produced separately and mixed together. The mixing proportions can be quantitatively determined from the absorption spectra.

It is advantageous to subject the dyestuff mixtures to mechanical treatment in suitable machines such as roller mills, if desired in presence of a dispersing agent, e.g., condensation products of naphthalenesulfonic acids and formaldehyde. In this way pigment pastes suitable for commercial use are obtained. The pastes can be converted into powders by a suitable drying process, for example spray drying, and the dry powder ground in a suitable grinding machine if desired.

The new pigment dyestuffs are insoluble or sparingly soluble in normal solvents. They are suitable for the mass dyeing of artificial fibers and paper, for pigmenting paint and lacquer media, synthetic resins and plastic moulding compounds, and for printing textiles and paper. They are characterized by good covering power and outstanding fastness to light when applied in high concentrations. In addition they are also very fast to washing, perspiration chlorination, blind vats and cross dyeing.

In the following examples all parts and percentages are by weight. The temperatures are in degrees centigrade.

*Example 1*

24.4 parts of 3.3'-dimethoxy-4.4'-diamino-1.1'-diphenyl are tertazotized. The filtered tetrazo solution and 45 parts of 30% sodium hydroxide solution are simultaneously added with stirring to a solution of 47.34 parts of 2 - hydroxynaphthalene - 3 - carboxylic acid - phenylamide, 3.48 parts of 1-phenyl-3-methyl-5-pyrazolone, 80 parts of methyl alcohol, 24 parts of 30% sodium hydroxide solution and 160 parts of water at room temperature.

On completion of coupling the reaction mass is heated for 1 hour at 80–85°, after which the precipitated dyestuff is separated, washed neutral and dried. It is a brown-violet powder which is practically insoluble in water and standard solvents at room temperature. In concentrated sulfuric acid, however, it dissolves with a blue-green coloration.

The crude neutral filter cake is mechanically treated in suitable equipment such as a ball or roller mill with the sodium salt of dinaphthylmethanedisulfonic acid and, if desired, water until the required particle size is obtained. The resultant dyestuff paste can be used as such for textile printing, paper dyeing and the spin-dyeing of viscose rayon to give navy blue shades of high covering power and very good fastness properties.

Alternatively, the paste can be dried by a suitable process, e.g. spray drying, to give pigment powders.

The water-insoluble disazo dyestuff can be converted into its copper complex compound as follows:

7.74 parts of the above dyestuff are added with stirring to a melt of 140 parts of sodium acetate, 30 parts of water, 20 parts of diethanolamine and 10 parts of crystallized copper sulfate at 80°. The mass is heated to 95° and held at this temperature for 2 hours. Then the temperature is raised to 105° and coppering is allowed to proceed at this temperature for 16 hours. After this time 250 parts of hot water are added to the melt and the precipitated copper-containing dyestuff filtered off, washed with water and dried. Upon grinding a dark powder is obtained which is practically insoluble in water and common solvents.

2 parts of a 20% aqueous paste of the pigment powder obtained according to the third paragraph of Example 1 are added to 235 parts of an aqueous sodium cellulose xanthogenate solution at 10–15° with a content of 20 parts of α-cellulose. The mass is agitated in an automatic mixer for 15 minutes so that the dyestuff suspension is homogeneously distributed in the viscose. The spinning solution is left standing overnight to allow the escape of trapped air. It is then pumped to the spinning unit and extruded into a sulfuric acid precipitating bath in the normal way. The viscose filament is collected and wound, desulfurized, washed, rinsed and dried. It is dyed to a deep blue which is outstandingly fast to light, washing, perspiration, chlorination, trichloroethylene, blind vats and cross dyeing.

*Example 2*

24.4 parts of 3.3'-dimethoxy-4.4'-diamino-1.1'-diphenyl are tertazotized. The filtered tetrazo solution and 45 parts of 30% sodium hydroxide solution are simultaneously introduced with stirring into a solution of 20.85 parts of 1-(3'-chloro)-phenyl-3-methyl-5-pyrazolone and 29.3 parts of 2-hydroxynaphthalene-3-carboxylic acid-(2'-metoxy)-phenylamide, 80 parts of methyl alcohol, 24 parts of 30% sodium hydroxide solution and 160 parts of water, at room temperature. On completion of coupling the precipitated dyestuff is filtered off and washed neutral.

100 parts of a 20% aqueous paste of this dyestuff (prepared as described in the third paragraph of Example 1) are mixed with 400 parts of gum tragacanth 3%, 400 parts of a 50% aqueous solution of egg albumin and 100 parts of a nonionic wetting agent. This paste is printed on a textile fabric and the print dried and steamed for 30 minutes at 100–101°. It is of violet shade and shows good fastness to washing, perspiration, chlorine, crocking and dry cleaning.

In place of gum tragacanth and egg albumin the printing paste can be formulated with binding agents of the type normally used for binding pigments to the fiber, e.g., those based on synthetic resins.

*Example 3*

The filtered tetrazo solution of 24.4 parts of 3.3'-dimethoxy-4.4'-diamino-1.1'-diphenyl and 20 parts of 30% sodium hydroxide solution are mixed with a solution of 26.3 parts of 2-hydroxynaphthalene-3-carboxylic acid-phenylamide, 40 parts of methyl alcohol, 12 parts of 30% sodium hydroxide solution and 80 parts of water, ice being added for cooling. On formation of the intermediate compound a mixture of 21.04 parts of 2-hydroxynaphthalene-3-carboxylic acid-phenylamide, 4.17 parts of 1-(3'-chloro)-phenyl-3-methyl-5-pyrazolone, 20 parts of pyridine, 40 parts of methyl alcohol, 12 parts of 30% sodium hydroxide solution and 80 parts of water is added to the suspension.

When the coupling reaction is completed the reaction mass is heated to 80–85°. After 1 hour at this temperature the precipitated dyestuff mixture is separated and washed neutral. The dyestuff preparation obtained from it by the method described in Example 1 dyes viscose in dark navy blue shades.

A dyestuff mixture with similarly good covering power is obtained when 90 parts of the symmetrical disazo dyestuff obtained from tetrazotized 3.3'-dimethoxy-4.4'-diamino-1.1'-diphenyl and 2-hydroxynaphthalene-3-carboxylic acid-phenylamide are mixed with 10 parts of the asymmetrical disazo dyestuff produced from tetrazotized 3.3'-dimethoxy - 4.4' - diamino-1.1'-diphenyl, 2-hydroxynaphthalene-3-carboxylic acid-phenylamide and 1-(3'-chloro)-phenyl-3-methyl-5-pyrazolone. The mixture is treated further as described in Example 1 to give a pigment paste or powder for dyeing.

*Example 4*

24.4 parts of 3.3'-dimethoxy-4.4'-diamino-1.1'-diphenyl are tetrazotized. The filtered tetrazo solution and 45 parts of 30% sodium hydroxide solution are simultaneously added to a solution composed of 1.22 parts of 1-phenyl-5-amino-3-methylpyrazole, 62.53 parts of 2-hydroxynaphthalene - 3 - carboxylic acid-(2'.5'-dimethoxy)-phenylamide, 80 parts of methyl alcohol, 24 parts of 30% sodium hydroxide solution and 160 parts of water. On completion of coupling the mass is heated to 80–85° and kept at this temperature for 1 hour, upon which the precipitated dyestuff is filtered off, washed neutral with water, and dried.

10 parts of the powder obtained thus are ground with 10 parts of Cellit (secondary cellulose acetate) and 160 parts of acetone in a ball mill until the required particle fineness is attained. The suspension is run into water and the product filtered off, washed with water and dried.

The resultant dyestuff preparation is incorporated in cellulose acetate spinning solutions to give filaments of navy blue shade. At high dyestuff concentration the spun-dyed filaments exhibit excellent fastness to light, washing, cross dyeing, peroxide, chlorine, hydrosulfite and dry cleaning.

In the following table descriptive data are given for further mixtures of water-insoluble disazo dyestuffs which can be obtained by the methods of Examples 1 to 4. In the table they are characterized by the tetrazo and the two coupling components, the molecular ratio of the first and second coupling components, and the shade in spun-dyed viscose rayon.

| Example No. | Tetrazo Component | 1. Coupling Component | 2. Coupling Component | Molecular Ratio | Shade in Spun-Dyed Viscose Rayon |
|---|---|---|---|---|---|
| 5 | 3.3'-dimethoxy-4.4'-diamino-1.1'-diphenyl. | 2-hydroxynaphthalene-3-carboxylic acid-(2'-methyl)-phenylamide. | 1-(4'-chloro)-phenyl-3-methyl-5-pyrazolone. | 9:1 | dark navy blue. |
| 6 | ___do___ | 2-hydroxynaphthalene-3-carboxylic acid-(4'-methoxy)-phenylamide. | 1-(2'.5'-dichloro)-phenyl-3-methyl-5-pyrazolone. | 9:1 | Do. |
| 7 | ___do___ | 2-hydroxynaphthalene-3-carboxylic acid-(2'-ethoxy)-phenylamide. | 1-(3'-cyano)-phenyl-3-methyl-5-pyrazolone. | 9.5:0.5 | Do. |
| 8 | ___do___ | 2-hydroxynaphthalene-3-carboxylic acid-(2'-methyl-4'-methoxy)-phenylamide. | 1-(4'-methyl)-phenyl-3-methyl-5-pyrazolone. | 9.5:0.5 | Do. |
| 9 | ___do___ | 2-hydroxynaphthalene-3-carboxylic acid-(4'-chloro)-phenylamide. | 1-(2'-methoxy)-phenyl-3-,etnyl-5-pyrazolone. | 9.3:0.7 | Do. |
| 10 | ___do___ | 2-hydroxynaphthalene-3-carboxylic acid-(2'-methyl-4'-chloro)-phenylamide. | 1-(2'-.5'-dimethyl)-phenyl-3-methyl-5-pyrazolone. | 9.5:0.5 | violet. |
| 11 | ___do___ | 2-hydroxynaphthalene-3-carboxylic acid-(3'-nitro)-phenylamide. | 1-(2'-nitro)-phenyl-3-methyl-5-pyrazolone. | 9:1 | navy blue. |
| 12 | ___do___ | 2-hydroxynaphthalene-3-carboxylic acid-(2')-naphthylamide. | 1-naphthyl(1')-3-methyl-5-pyrazolone. | 9:1 | Do. |
| 13 | ___do___ | 2-hydroxynaphthalene-3-carboxylic acid-(2'.4'-dimethoxy-5'-chloro)-phenyl-amide. | 1-naphthyl(2')-3-methyl-5-pyrazolone. | 9.4:0.6 | bordeaux. |
| 14 | ___do___ | 2-hydroxynaphthalene-3-carboxylic acid-phenyl-amide. | 1-phenyl-3-amino-5-pyrazolone. | 9:1 | dark navy blue. |
| 15 | ___do___ | ___do___ | 1-phenyl-3-phenylamino-5-pyrazolone. | 9:1 | Do. |
| 16 | ___do___ | ___do___ | 1-phenyl-5-pyrazolone-3-carboxylic acid-amide. | 9:1 | Do. |
| 17 | ___do___ | ___do___ | 1.3-diphenyl-5-pyrazolone. | 9:1 | Do. |
| 18 | ___do___ | ___do___ | 1-phenyl-5-pyrazolone-3-carboxylic acid ethyl ester. | 9:1 | Do. |
| 19 | ___do___ | ___do___ | 1-phenyl-5-pyrazolone-3-carboxylic acid-phenylamide. | 9:1 | Do. |
| 20 | 3.3'-diethoxy-4.4'-diamino-1.1'-diphenyl. | ___do___ | 1-phenyl-3-methyl-5-pyrazolone. | 8:2 | Do. |
| 21 | 3.3'-dimethyl-4.4'-diamino-1.1'-diphenyl. | ___do___ | ___do___ | 8:2 | Do. |
| 22 | 3.3'-dichloro-4.4'-diamino-1.1'-diphenyl. | 2-hydroxynaphthalene-3-carboxylic acid-(2'-methoxy)-phenylamide. | ___do___ | 9:1 | bordeaux. |
| 23 | 4.4'-diamino-1.1'-diphenyl. | 2-hydroxynaphthalene-3-carboxylic acid-(2'.5'-dimethoxy)-phenylamide. | ___do___ | 9:1 | Do. |
| 24 | 3.3'-dimethoxy-4.4'-diamino-1.1'-diphenyl. | 2-hydroxynaphthalene-3-carboxylic acid-amide. | ___do___ | 1:1 | black. |
| 25 | ___do___ | 2-hydroxynaphthalene-3-carboxylic acid-methyl-amide. | ___do___ | 8:2 | dark navy blue. |
| 26 | ___do___ | 2-hydroxynaphthalene-3-carboxylic acid-dimethyl-amide. | ___do___ | 9:1 | Do. |
| 27 | ___do___ | 2-hydroxynaphthalene-3-carboxylic acid-propylamide. | ___do___ | 9:1 | Do. |
| 28 | ___do___ | 2-hydroxynaphthalene-3-carboxylic acid-cyclo-hexylamide. | ___do___ | 9.7:0.3 | navy blue. |
| 29 | ___do___ | 2-hydroxynaphthalene-3-carboxylic acid-benzyl-amide. | ___do___ | 9.5:0.5 | Do. |
| 30 | ___do___ | 2-hydroxynaphthalene-3-carboxylic acid-(1')-naphthylamide. | ___do___ | 9:1 | dark navy blue. |
| 31 | 3.3'-diethyl-4.4'-diamino-1.1', diphenyl. | 2-hydroxynaphthalene-3-carboxylic acid-phenylamide. | ___do___ | 7:3 | navy blue. |
| 32 | 3.3'-difluoro-4.4'-diamino-1.1'-diphenyl. | 2-hydroxynaphthalene-3-carboxylic acid-(2'-methoxy)-phenylamide. | ___do___ | 9:1 | bordeaux. |

Having thus disclosed the invention what we claim is:

1. A mixture of water-insoluble disazo dyestuffs obtained by coupling 1 mol of the tetrazo compound of a diamine of the formula

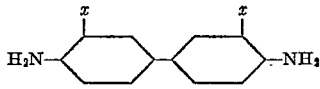

wherein each $x$ represents a member selected from the group consisting of hydrogen, chlorine, bromine, fluorine, methyl, ethyl, methoxy and ethoxy, with 1.0 to 1.94 mols of a member selected from the group consisting of 2-hydroxynaphthalene-3-carboxylic acid-amide,
2-hydroxynaphthalene-3-carboxylic acid-lower alkylamide,
2-hydroxynaphthalene-3-carboxylic acid-di(lower alkyl)-amide,
2-hydroxynaphthalene-3-carboxylic acid-cyclohexylamide,
2-hydroxynaphthalene-3-carboxylic acid-benzylamide,
2-hydroxynaphthalene-3-carboxylic acid-(2')-naphthylamide,
2-hydroxynaphthalene-3-carboxylic acid-(1')-naphthylamide,
2-hydroxynaphthalene-3-carboxylic acid-phenylamide,
2-hydroxynaphthalene-3-carboxylic acid-(2'-methyl)-phenylamide,
2-hydroxynaphthalene-3-carboxylic acid-(2'-methoxy)-phenylamide,
2-hydroxynaphthalene-3-carboxylic acid-(4'-methoxy)-phenylamide,
2-hydroxynaphthalene-3-carboxylic acid-(2'-ethoxy)-phenylamide,
2-hydroxynaphthalene-3-carboxylic acid-(4'-chloro)-phenylamide,
2-hydroxynaphthalene-3-carboxylic acid-(2'.5'-dimethoxy)-phenylamide,
2-hydroxynaphthalene-3-carboxylic acid-(2'-methyl-4'-methoxy)-phenylamide,
2-hydroxynaphthalene-3-carboxylic acid-(2'-methyl-4'-chloro)-phenylamide,
2-hydroxynaphthalene-3-carboxylic acid-(2.4'-dimethoxy-5'-chloro)-phenylamide and
2-hydroxynaphthalene-3-carboxylic acid-(3'-nitro)-phenylamide, and 1.0 to 0.06 mol of a 1-aryl-5-pyrazolone of the formula

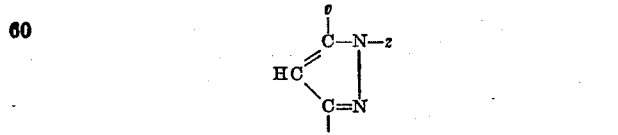

wherein $v$ stands for a member selected from the group consisting of —OH and —$NH_2$, $w$ stands for a member selected from the group consisting of

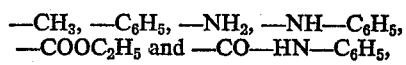

and $z$ stands for a member selected from the group consisting of phenyl, chlorophenyl, dichlorophenyl, methylphenyl, dimethylphenyl, methoxyphenyl, cyanophenyl and nitrophenyl.

2. A mixture of water-insoluble disazo dystuffs obtained by coupling 1 mol of the tetrazo compound of a diamine of the formula

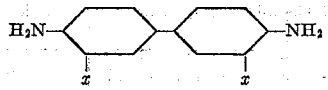

wherein each $x$ represents a member selected from the group consisting of hydrogen, chlorine, bromine, fluorene, methyl, ethyl, methoxy and ethoxy, with 1.75 to 1.94 mol of a 2-hydroxynaphthalene-3-carboxylic acid-amide of the formula

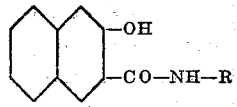

wherein R represents a member selected from the group consisting of lower alkyl, phenyl, lower alkoxyphenyl and di-(lower alkoxy)-phenyl, and 0.25 to 0.06 mol of a 1-aryl-5-pyrazolone of the formula

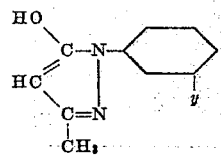

wherein $y$ represents a member selected from the group consisting of a hydrogen atom and a cyano group.

3. The mixture of water-insoluble disazo dyestuffs obtained by coupling 1 mol of the tetrazo compound of 4.4'-diamino-3.3'-dimethoxy-1.1'-diphenyl with 1.8 mols of 2-hydroxynaphthalene-3-carboxylic acid - phenylamide and 0.2 mol of 1-phenyl-3-methyl-5-pyrazolone.

4. The mixture of water-insoluble disazo dyestuffs obtained by coupling 1 mol of the tetrazo compound of 4.4'-diamino-3.3'-dimethoxy-1.1'-diphenyl with 1.8 mols of 2-hydroxynaphthalene-3-carboxylic acid-n-propylamide and 0.2 mol of 1-phenyl-3-methyl-5-pyrazolone.

5. The mixture of water-insoluble disazo dyestuffs obtained by coupling 1 mol of the tetrazo compound of 4.4'-diamino-3.3'-dimethoxy-1.1'-diphenyl with 1.9 mols of 2-hydroxynaphthalene-3-carboxylic acid-(2'-ethoxy)-phenylamide and 0.1 mol of 1-(3'-cyano)-phenyl-3-methyl-5-pyrazolone.

6. The mixture of water-insoluble disazo dyestuffs obtained by coupling 1 mol of the tetrazo compound of 4.4'-diamino-3.3'-difluoro - 1.1' - diphenyl with 1.8 mols of 2-hydroxynaphthalene - 3 - carboxylic acid-(2' - methoxy)-phenylamide and 0.2 mol of 1-phenyl-3-methyl-5-pyrazolone.

7. The mixture of water-insoluble disazo dyestuffs obtained by coupling 1 mol of the tetrazo compound of 4.4'-diamino-1.1'-diphenyl with 1.8 mols of 2-hydroxynaphthalene-3-carboxylic acid-(2'.5'-dimethoxy)-phenylamide and 0.2 mol of 1-phenyl-3-methyl-5-pyrazolone.

References Cited in the file of this patent

UNITED STATES PATENTS

| | | |
|---|---|---|
| 1,001,286 | Laska | Aug. 22, 1911 |
| 1,042,356 | Laska et al. | Oct. 22, 1912 |
| 1,995,902 | Scheurer et al. | Mar. 26, 1935 |
| 2,031,426 | Niemann | Feb. 18, 1936 |
| 2,031,651 | Hitch et al. | Feb. 25, 1936 |
| 2,036,944 | Krebser | Apr. 7, 1936 |
| 2,145,398 | Lang | Jan. 31, 1939 |
| 2,269,885 | Twitchett | Jan. 13, 1942 |
| 2,384,419 | Fleischhauer et al. | Sept. 4, 1945 |
| 2,476,261 | Mayer et al. | July 12, 1949 |
| 2,517,924 | Powell | Aug. 8, 1950 |
| 2,573,851 | Lacey et al. | Nov. 6, 1951 |
| 2,607,769 | Armento | Aug. 19, 1952 |
| 2,667,476 | Stratton et al. | Jan. 26, 1954 |

FOREIGN PATENTS

| | | |
|---|---|---|
| 633,215 | Great Britain | Dec. 12, 1949 |
| 1,007,906 | Germany | May 9, 1957 |